United States Patent
Hikita et al.

(10) Patent No.: US 6,842,859 B1
(45) Date of Patent: Jan. 11, 2005

(54) AUTHENTICATION SYSTEM, AUTHENTICATION DEVICE, AUTHENTICATION DATA PRODUCING DEVICE, AND AUTHENTICATION METHOD

(75) Inventors: Junichi Hikita, Kyoto (JP); Yoshihiro Ikefuji, Kyoto (JP); Shigemi Chimura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/355,926
(22) PCT Filed: Jan. 30, 1998
(86) PCT No.: PCT/JP98/00414
 § 371 (c)(1),
 (2), (4) Date: Nov. 5, 1999
(87) PCT Pub. No.: WO98/36527
 PCT Pub. Date: Aug. 20, 1998

(30) Foreign Application Priority Data

Feb. 13, 1997 (JP) .............................................. 9/029182

(51) Int. Cl.⁷ ................................................. H04L 9/00
(52) U.S. Cl. ....................................... 713/170; 713/169
(58) Field of Search ........................................ 713/170

(56) References Cited

U.S. PATENT DOCUMENTS

| | | | | |
|---|---|---|---|---|
| 4,310,720 A | * | 1/1982 | Check, Jr. ................... | 713/155 |
| 4,532,416 A | * | 7/1985 | Berstein ..................... | 235/379 |
| 4,799,258 A | * | 1/1989 | Davies ....................... | 713/159 |
| 4,933,971 A | * | 6/1990 | Bestock et al. .............. | 380/44 |
| 5,060,263 A | * | 10/1991 | Bosen et al. ................ | 713/184 |
| 5,109,152 A | * | 4/1992 | Takagi et al. ............... | 235/380 |
| 5,325,434 A | | 6/1994 | Spaanderman et al. | |
| 5,915,226 A | * | 6/1999 | Martineau ................... | 455/558 |

FOREIGN PATENT DOCUMENTS

| | | |
|---|---|---|
| EP | 0 266 944 A2 | 5/1988 |
| EP | 0 538 946 A1 | 4/1993 |
| JP | 60-220636 | 11/1985 |
| JP | 62-118472 | 5/1987 |
| JP | 63-301664 | 12/1998 |
| WO | WO 92/02087 | 2/1992 |

OTHER PUBLICATIONS

"Modern Cyptography Theory," 3rd Edition, IEICE, May 20, 1989, Ikeno et al. Partial Translation.

* cited by examiner

Primary Examiner—Gregory Morse
Assistant Examiner—Christopher J Brown
(74) Attorney, Agent, or Firm—Arent Fox, PLLC

(57) ABSTRACT

Upon receiving an encipherment command, an enciphered authentication data generation circuit generates an enciphered authentication data based on a basic authentication data including a random number portion using an encipherment rule. The encipherment rule changes according to the number of supplied encipherment commands. A transmission circuit 7 transmits the enciphered authentication data. A reception circuit 9 receives the enciphered authentication data transmitted from a second device 300. A prohibition command output circuit 11 determines whether the enciphered authentication data transmitted from the second device 300 matches with an enciphered authentication data that would be generated if the same number of encipherment commands were supplied to an enciphered authentication data generation circuit of a first device 200, and outputs a prohibition command to prohibit a transmission of the data to be transmitted when the determination result is negative.

14 Claims, 6 Drawing Sheets

FIG.5A
AT FIRST TRANSMISSION

| LATCH 49 | D |
|---|---|
| LATCH 59 | 0 |
| SHIFT REGISTER | D' |

FIG.5B
AT PREPARATION

| LATCH 49 | D |
|---|---|
| LATCH 59 | (DeorD')' |
| SHIFT REGISTER | — |

FIG.5C
AT RECEPTION

| LATCH 49 | D |
|---|---|
| LATCH 59 | (DeorD')' |
| SHIFT REGISTER | (DeorD')' |

FIG.6A
AT RECEPTION

| LATCH 89 | D |
|---|---|
| LATCH 99 | 0 |
| SHIFT REGISTER | D' |

FIG.6B
AT FIRST TRANSMISSION

| LATCH 89 | D |
|---|---|
| LATCH 99 | D' |
| SHIFT REGISTER | (DeorD')' |

FIG.6C
AT PREPARATION

| LATCH 89 | D |
|---|---|
| LATCH 99 | (Deor(DeorD')')' |
| SHIFT REGISTER | — |

AUTHENTICATION SYSTEM, AUTHENTICATION DEVICE, AUTHENTICATION DATA PRODUCING DEVICE, AND AUTHENTICATION METHOD

TECHNICAL FIELD

The present invention relates to an authentication at a transmission of data to be transmitted between a first device and a second device, and more particularly to an improvement in security thereof.

BACKGROUND ART

A data communication system employing an IC card has been proposed for applications to ski lifts, automatic card examination devices for railways, automatic sorting of luggage or the like.

FIG. 1 shows a structure of a communication system employing a non contact type IC card as an example of data communication systems employing IC cards. This system includes an interrogator 240 (mounted on a gate of a ski lift, for example) and a non contact type IC card 220.

Interrogator 240 sends a high frequency carrier from an oscillating circuit 249 through an antenna 241 under the control of a control portion 248 on the side of the interrogator. When non contact type IC card 220 comes to the vicinity of interrogator 240, non contact type IC card 220 receives the high frequency carrier at an antenna 223 thereof. A power supply generation circuit 225 converts the received high frequency wave into a d.c. current and supplies power to other circuit portions. Thus non contact type IC card 220 becomes operable in the vicinity of interrogator 240.

Here, information is transmitted from interrogator 240 to non contact type IC card 220 as the above mentioned high frequency carrier is demodulated at a modulating/demodulating circuit 233. A control portion 235 on the side of the card performs required processes such as rewriting of contents of a memory 237 and answering the received information based on the demodulated information.

On the other hand, the information is also transmitted from non contact type IC card 220 to interrogator 240. As non contact type IC card 220 is not provided with an oscillating circuit, the information transmission is performed as described below. First, unmodulated high frequency carrier is sent from the side of interrogator 240, and an impedance of a resonance circuit 222 is changed by modulating/demodulating circuit 233 at the side of non contact type IC card 220. This change in impedance is detected by interrogator 240 as the impedance change in a resonance circuit 242 on the side thereof and is demodulated by a modulating/demodulating circuit 246. Control portion 248 receives the demodulated information and performs required processes.

When non contact type IC card 220 leaves interrogator 240, the power supply is stopped and therefore the operation of non contact type IC card 220 is stopped. At this time, memory 237, which is a non-volatile memory, holds the stored information regardless of a cease of power supply.

Non contact type IC card 220 as described above can be used as a prepaid card by storing a predetermined count in memory 237 and rewriting data in memory 237 according to a use count.

The communication data between the interrogator and the IC card is enciphered. By this encipherment, an unauthorized computer connected in place of an IC card is prevented from pretending as an authorized IC card (hereinafter this is called "pretense").

The conventional communication system employing the IC card as described above, however, is not immune to the problem. For example, even with the encipherment of the communication data as described above, the pretense is possible once a cipher is decrypted.

In particular, when the IC card is used for a telephone, once an authentication process to set up the communication is deciphered and a connected state is established, the connected state can be maintained for hours at will.

DISCLOSURE OF THE INVENTION

An object of the present invention is to provide an authentication system and an authentication method to prevent the so called pretense.

Another object of the present invention is to provide an authentication system and an authentication method for an authentication system of a telephone where a determination can be made whether there is pretense or not even after an authentication process at the set up of the connection is deciphered.

In brief, the present invention is an authentication system for determining whether a data transmission between a first device and a second device is to be permitted or not, and each of the first and the second devices has a decoding circuit and a transmitting circuit.

The decoding circuit enciphers the data while changing an encipherment rule for each unit transmission of the data to be transmitted. The transmitting circuit transmits the enciphered authentication data.

According to another aspect of the present invention, the present invention is an authentication system transmitting an enciphered authentication data between a first device and a second device and determining whether a transmission of data to be transmitted between said first device and said second device is to be permitted or not, and each of the first and the second devices includes a decoding circuit and a transmitting circuit.

The decoding circuit enciphers the authentication data while changing an encipherment rule for each unit transmission of the data to be transmitted. The transmitting circuit transmits the enciphered authentication data.

According to still another aspect of the present invention, the present invention is an authentication system employed upon a transmission of data to be transmitted between a first device and a second device, and the first device includes a basic authentication data store circuit, a first enciphered authentication data generation circuit, a first transmitting circuit, a first receiving circuit, and a prohibition command output circuit. The second device includes a second receiving circuit, a basic authentication data acquisition circuit, a second enciphered authentication data generation circuit, and a second transmitting circuit.

The first basic authentication data store circuit stores a basic authentication data. The first enciphered authentication data generation circuit generates an enciphered authentication data based on the basic authentication data using an encipherment role when an encipherment command is provided. The first enciphered authentication data generation circuit changes the encipherment rule according to the number of supplied encipherment commands.

The first transmitting circuit transmits the enciphered authentication data. The first receiving circuit receives an enciphered authentication data transmitted from the second device.

The second receiving circuit receives the enciphered authentication data transmitted from the first device. The basic authentication data acquisition circuit extracts the basic authentication data from the enciphered authentication data based on the encipherment rule employed in the enciphered authentication data generation circuit.

The second basic authentication data store circuit stores the extracted basic authentication data.

The second enciphered authentication data generation circuit generates an enciphered authentication data according to the same encipherment rule as in the first device. The second enciphered authentication data generation circuit changes the encipherment rule according to the number of supplied encipherment commands. The second transmitting circuit transmits the enciphered authentication data.

The prohibition command output circuit determines whether or not the enciphered authentication data transmitted from the second device matches with an enciphered authentication data that would be generated when the same number of encipherment commands were supplied to the first enciphered authentication data generation circuit, and supplies a prohibition command to prohibit the transmission of the data to be transmitted when a determination result is negative.

According to still more another aspect of the present invention, the present invention is an authentication method employed upon a transmission of data to be transmitted between two devices, and includes the steps of: changing an encipherment rule according to the number of supplied encipherment commands, and generating a first enciphered authentication data based on a basic authentication data at one device of the two devices; transmitting the first enciphered authentication data from one device to another device of the two devices; deciphering the first enciphered authentication data received from one device, extracting the basic authentication data, generating a second enciphered authentication data according to the encipherment rule at another device and transmitting the second enciphered authentication data; comparing the second enciphered authentication data received at one device with data generated by enciphering the fast enciphered authentication data according to the encipherment rule according to the number of supplied encipherment commands and determining whether the two data match with each other; and allowing the transmission of the data to be transmitted when a result of the determination is a match.

Therefore, a main advantage of the present invention is that as the encipherment rule for enciphering the data transmitted between the first device and the second device is changed for each unit transmission, an authentication system where the so called pretense is hard to perform can be provided.

Another advantage of the present invention is that the encipherment rule for enciphering the authentication data is changed for each unit transmission in order to modify the enciphered authentication data transmitted between the first device and the second device, whereby an authentication system where the so called pretense is hard to perform can be provided.

Still another advantage of the present invention is that the basic authentication data stored in the first device can be transmitted to the second device and that the transmission between the first device and the second device can be prohibited when the enciphered authentication data in the second device is generated according to a different generation process. Thus, an authentication system where the so called pretense is hard to perform can be provided.

A still further advantage of the present invention is that the transmission between the first device and the second device can be prohibited when the generation process of the enciphered authentication data performed by the second device is different from the generation process of the enciphered authentication data performed by the first device.

A still more further advantage of the present invention is that even if the basic authentication data is not stored in one of the two devices performing the data transmission, the transmission of data can be prohibited when the enciphered authentication data generated in one device does not match with the enciphered authentication data generated in another device.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5A shows a status of data held in a basic authentication data latch, a comparing latch, and a shift register of first device 200 at a first transmission, FIG. 5B shows a status of data held in the basic authentication data latch, the comparing latch, and the shift register of first device 200 at a preparation, and FIG. 5C shows a status of data held in the basic authentication data latch, the comparing latch, and the shift register of first device 200 at a reception.

FIG. 6A shows a status of data held in a basic authentication data latch, a comparing latch, and a shift register of a second device 300 at a reception, FIG. 6B shows a status of data held in the basic authentication data latch, the comparing latch, and the shift register of second device 300 at a transmission, and FIG. 6C shows a status of data held in the basic authentication data latch, the comparing latch, and the shift register of second device 300 at a preparation.

BEST MODES FOR CARRYING OUT THE INVENTION

Figure 1:
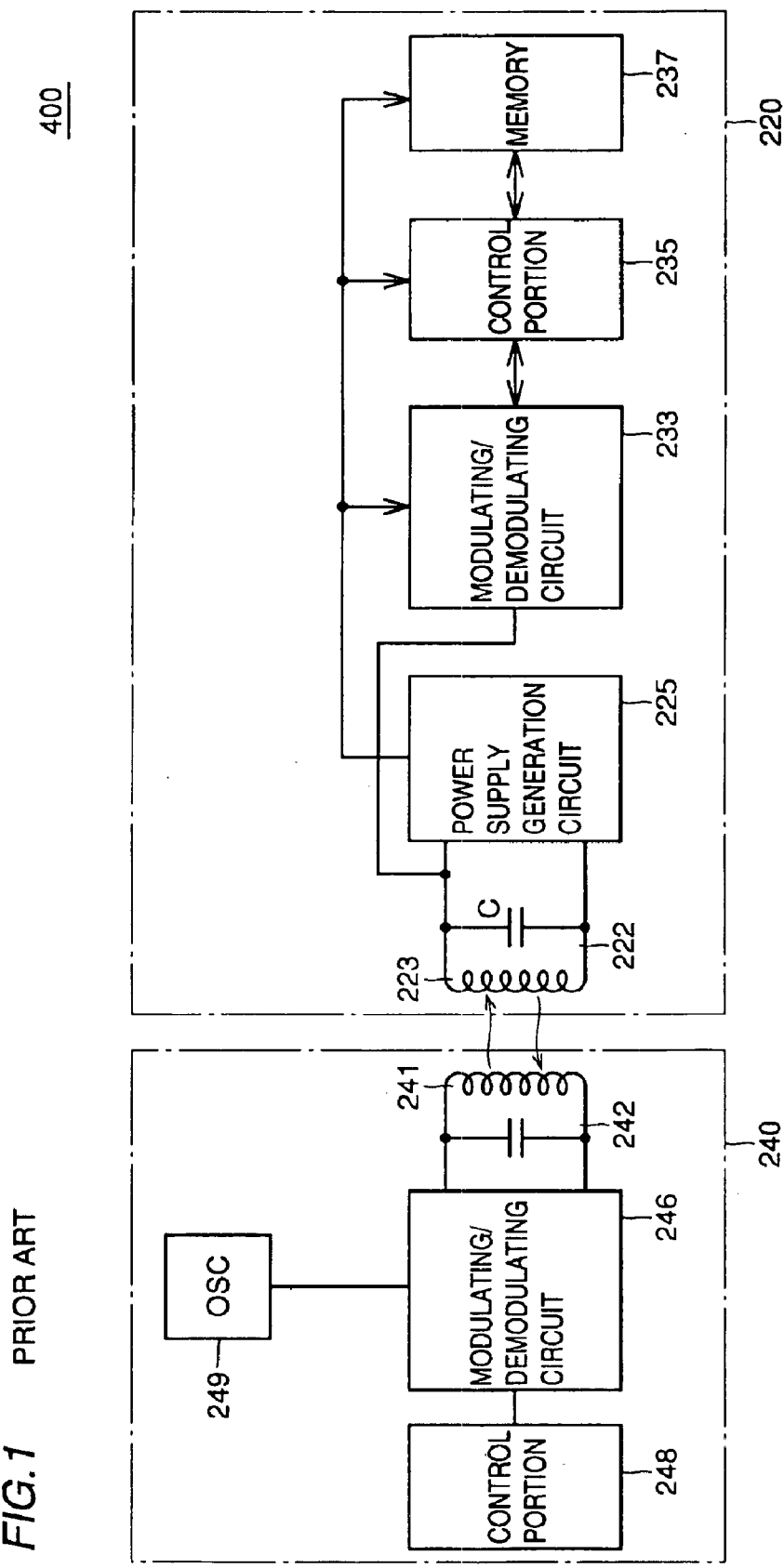
FIG. 1 shows a conventional IC card 400.
Figure 2:
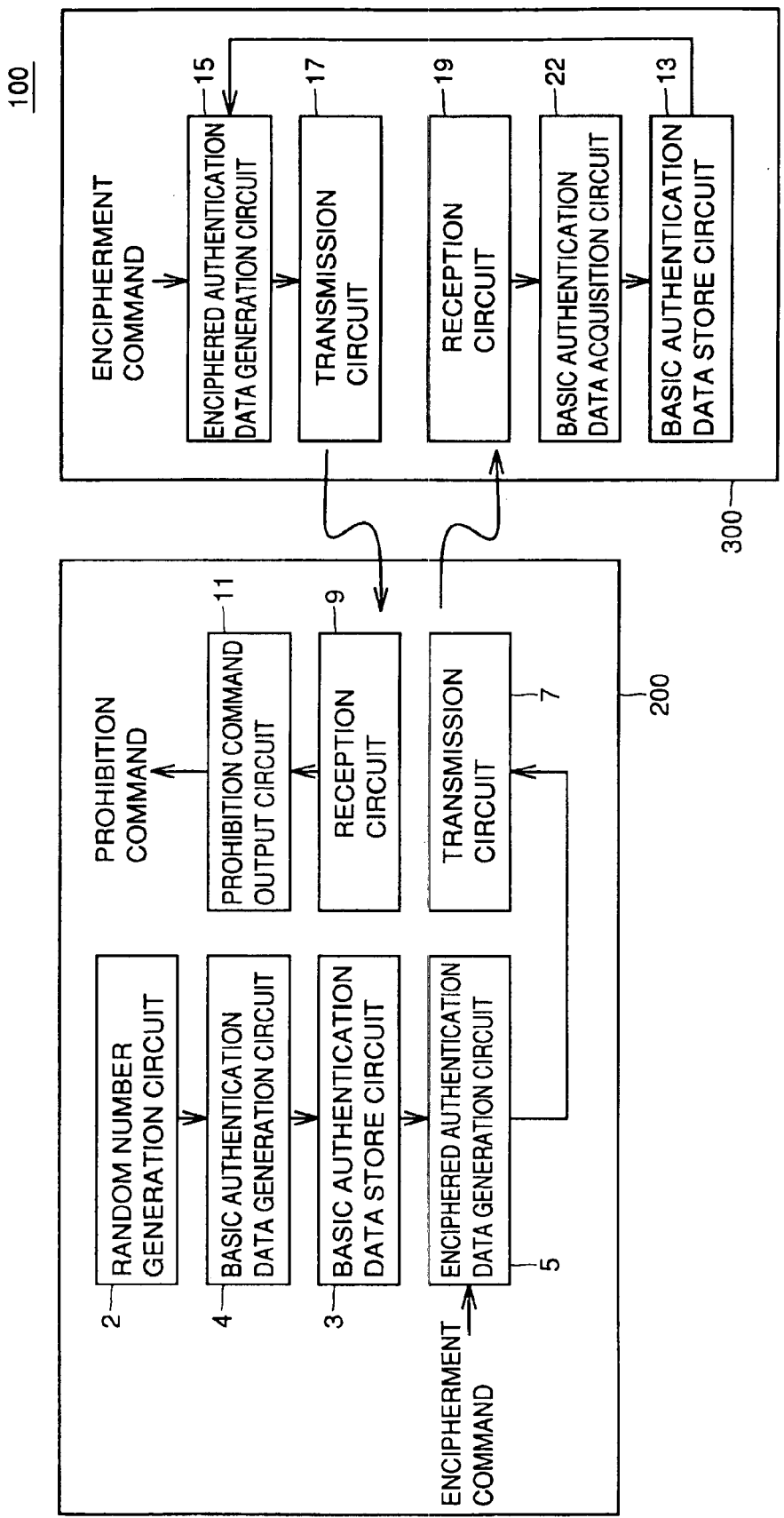
FIG. 2 shows an overall structure of an authentication system 100 according to the present invention.

FIG. 2 is a functional block diagram showing a structure of an authentication system 100 according to the present invention. With reference to FIG. 2, authentication system 100 performs an authentication upon a transmission of data to be transmitted between a first device 200 and a second device 300.

First device 200 includes, a random number generation circuit 2, a basic authentication data generation circuit 4, a basic authentication data store circuit 3, an enciphered authentication data generation circuit 5, a transmission circuit 7, a reception circuit 9 and a prohibition command output circuit 11. Random number generation circuit 2 generates a random number. Basic authentication data generation circuit 4 generates a basic authentication data to be stored in basic authentication data store circuit 3, based on a preset setting data and the random number.

Upon receiving an encipherment command, enciphered authentication data generation circuit 5 generates an enciphered authentication data based on the basic authentication data using the encipherment rule. The encipherment rule changes according to the number of supplied encipherment commands. In this embodiment, the encipherment rule is changed according to the number of supplied encipherment commands by changing the number of processes repeated for enciphering the enciphered authentication data. Transmission circuit 7 transmits the enciphered authentication data.

On the other hand, second device 300 includes a reception circuit 19, a basic authentication data acquisition circuit 22, a basic authentication data store circuit 13, an enciphered authentication data generation circuit 15 and a transmission circuit 17.

Reception circuit 19 receives the enciphered authentication data transmitted from first device 200. Basic authentication data acquisition circuit 22 extracts the basic authentication data from the enciphered authentication data based on the encipherment rule employed at enciphered authentication data generation circuit 5 of first device 200. Basic authentication data store circuit 13 stores the extracted basic authentication data.

Enciphered authentication data generation circuit 15 generates an enciphered authentication data according to the same encipherment rule as employed at enciphered authentication data generation circuit 5.

Here, the encipherment rule changes according to the number of supplied encipherment commands as in the first device. Transmission circuit 17 transmits the enciphered authentication data.

Reception circuit 9 of first device 200 receives the enciphered authentication data transmitted from second device 300. Prohibition command output circuit 11 determines whether the enciphered authentication data transmitted from second device 300 matches with an enciphered authentication data that would be generated when the same number of encipherment commands were given to the enciphered authentication data generation circuit of first device 200, and when the determination result is negative, prohibition command output circuit 11 outputs a prohibition command to prohibit the transmission of the data to be transmitted.

Therefore, the basic authentication data stored in first device 200 can be transmitted to second device 300.

When the enciphered authentication data in second device 300 is generated by a generation process different from that performed for generating the enciphered authentication data in the first device, the transmission between first device 200 and second device 300 can be prohibited. Thus, the authentication system where the so called pretense is hard to perform can be provided.

Figure 3:
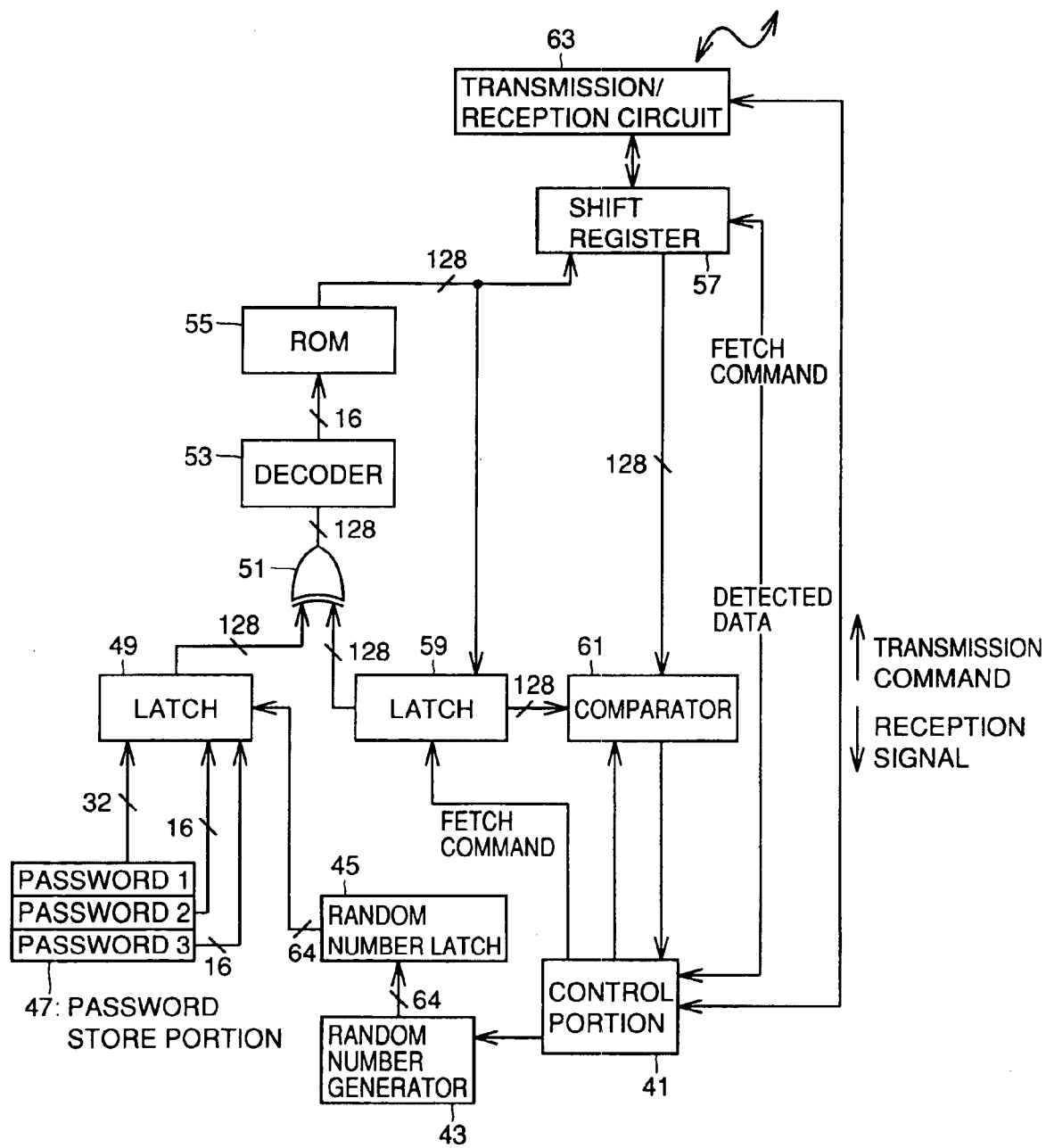
FIG. 3 shows a hardware structure of a first device 200.

FIG. 3 is a schematic block diagram referenced for describing a hardware structure of first device 200.

First device 200 includes a main control portion 41, a random number generator 43, a random number latch 45, a password store portion 47, a basic authentication data latch 49, a computing element 51, a decoder 53, an ROM (Read Only Memory) 55, a shift register 57, a comparing latch 59, a comparator 61, and a transmission/reception circuit 63.

Main control portion 41 controls every portion of first device 200 as described later.

Random number generator 43 generates a 64-bit random number, for example, when a random number generation command is supplied from main control portion 41.

Random number latch 45 holds the random number generated at random number generator 43.

Password store portion 47 stores three passwords. Here, a password 1 is a 32-bit password for a first hardware manufacturer, a password 2 is a 16-bit password for an operator of first device 200, and a password 3 is a 16-bit password for a software designer of the first device.

Basic authentication data latch 49 holds 128-bit data supplied from password store portion 47 and random number latch 45. In this embodiment; data held in basic authentication data latch 49 is the basic authentication data.

Comparing latch 59 holds a 128-bit initial value in an initial state. In this embodiment, "00 . . . 00" (128 bits), for example, is held as the initial value.

Computing element 51 performs a predetermined operation on data held in basic authentication data latch 49 and comparing latch 59. To be specific, computing element 51 performs an exclusive OR operation on these data. Upon receiving 128-bit data, decoder 53 decodes the data into 16-bit data. ROM 55 stores data of 128-bit data length corresponding to each 16-bit address and data converts the 16-bit data into a predetermined 128-bit data. Thus the encipherment process for 128-bit data is performed.

Comparator 61 compares data from shift register 57 with data from comparing latch 59 and outputs the comparison result to main control portion 41. Transmission/reception circuit 63 transmits/receives data to/from second device 300.

In shift register 57, every 128 bits of input/output to/from ROM 55 or comparator 61 are processed in parallel, and input/output to/from transmission/reception circuit 63 is processed in series one bit by one bit.

Figure 4:
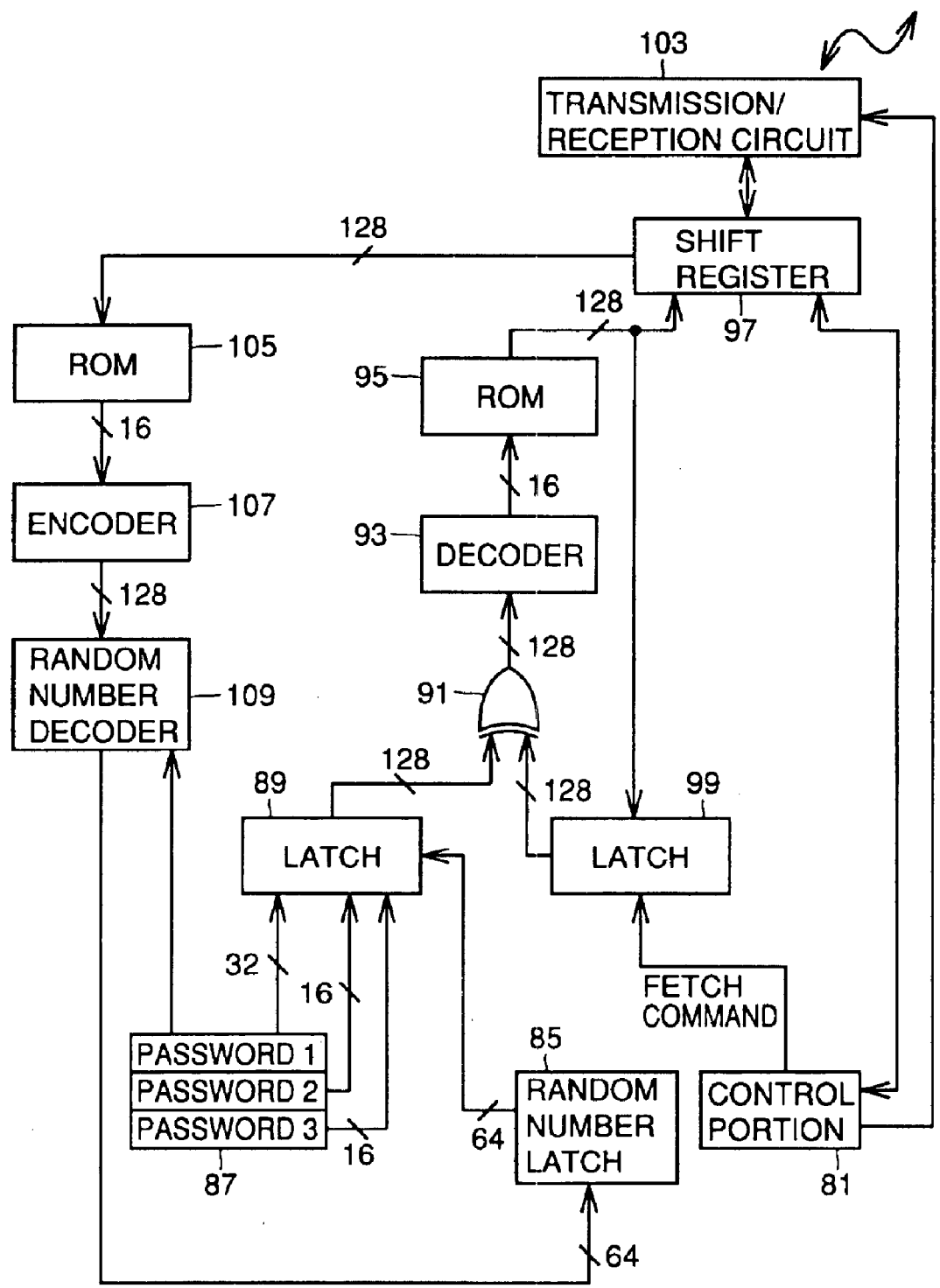
FIG. 4 shows a hardware structure of a second device 300.

FIG. 4 is a schematic block diagram referenced for describing a hardware structure of second device 300.

Second device 300 includes a main control portion 81, a random number latch 85, a password store portion 87, a basic authentication data latch 89, a computing element 91, a decoder 93, an ROM 95, a shift register 97, a comparing latch 99, a transmission/reception circuit 103, an ROM 105, an encoder 107, and a random number decoder 109.

Random number latch 85, password store portion 87, basic authentication data latch 89, computing element 91, decoder 93, ROM 95, shift register 97, comparing latch 99, and transmission/reception circuit 103 are of the same structures with random number latch 45, password store portion 47, basic authentication data latch 49, computing element 51, decoder 53, ROM 55, shift register 57, comparing latch 59, and transmission/reception circuit 63 of FIG. 2, respectively, and the description thereof will not be repeated.

ROM 105 is for performing a process (deciphering) reverse to that of ROM 55. ROM 105 stores data of 16-bit data length corresponding to each 128-bit address and converts 128-bit data to predetermined 16-bit data.

Encoder 107 performs a process reverse to that of decoder 53. Upon receiving 16-bit data, encoder 107 encodes the data into predetermined 128-bit data. Random number decoder 109 takes 64-bit data out from the 128-bit data, employing the 64-bit data stored in password store portion 87. The 64-bit data thus obtained is held in random number latch 85.

Thus, second device 300, though having a similar structure to first device 200, is different from the first device in the following point.

Second device 300 includes ROM 105, encoder 107 and random number decoder 109 instead of random number generator 43 and comparator 61.

Next, an authentication process will be described.

First, in first device 200, when first 8 bit of the data to be transmitted is supplied to shift register 57, main control portion 41 detects it and provides a random number generation command to random number generator 43.

In response to the command, random number generator 43 generates a random number of 64 bits. Here, the value of the 64-bit random number is represented by r.

The value of the random number generated at random number generator 43 is held in random number latch 45.

Basic authentication data latch 49 holds 128-bit data supplied from password store portion 47 and random number latch 45.

Here, data held in basic authentication data latch 49 is represented as data D. Here, comparing latch 59 holds an initial value "00 . . . 00" (128 bits) in an initial state, and computing element 51 performs an exclusive OR operation.

Decoder 53 decodes 128-bit data to 16-bit data. ROM 55 data converts the supplied 16-bit data to 128-bit data. The 128-bit data is supplied to shift register 57. The data supplied to shift register 57 is represented as data D'. The data D' is added to the head of the data to be transmitted and the resulting data is transmitted from transmission/reception circuit 63.

FIG. 5A is a diagram showing data held in basic authentication data latch 49, comparing latch 59 and shift register 57; FIG. 5A, FIG. 5B and FIG. 5C show status of data at a first transmission, at a preparation and at a reception, respectively.

On the other hand, FIG. 6 is a diagram showing a transition of data held in the basic authentication data latch, the comparing latch, and the shift register of second device 300; FIG. 6A, FIG. 6B and FIG. 6C show status of data at a reception, at a transmission and at a preparation, respectively.

With reference to FIGS. 5A–6C, as shown in FIG. 5A, at a first transmission of the enciphered authentication data, basic authentication data latch 49 holds data D, comparing latch 59 holds data 0, and shift register 57 holds data D'. Then, main control portion 41 outputs a fetch command to comparing latch 59.

Upon receiving the fetch command, comparing latch 59 holds data D', because data from ROM 55, that is data D', has been supplied to an input of comparing latch 59.

When comparing latch 59 holds data D', data from ROM 55, that is data (D eor D')' is supplied to the input of comparing latch 59 through computing element 51, decoder 53, and ROM 55.

Here, D eor D' represents an exclusive OR of data D and data D'.

Main control portion 41 again outputs the fetch command to comparing latch 59. Whereby data (D eor D')' is held in comparing latch 59.

Thus in first device 200, comparing latch 59 holds data generated by further enciphering the enciphered authentication data supplied to transmission/reception circuit 63 after the transmission to second device 300 as shown in FIG. 5B.

On the other hand, second device 300 shown in FIG. 4 receives the data to be transmitted with data D' at transmission/reception circuit 103. First 128-bit data of the data to be transmitted with data D' is supplied to ROM 105 and is data converted to 16-bit data.

Encoder 107 encodes the supplied 16-bit data to 128-bit data.

Random number decoder 109 takes 64-bit data from the 128-bit data using 64-bit data stored in password store portion 87. Thus obtained 64-bit data is held in random number latch 85.

Thus, the random number r generated in first device 200 can be transmitted to random number latch 85 of second device 300.

Next, in response to a reception signal of transmission/reception circuit 103, main control portion 81 supplies the fetch command to basic authentication data latch 89. Then basic authentication data latch 89 fetches data held in random number latch 85 and password store portion 87. In this case, shift register 97 holds data D', the basic authentication data latch holds data D and comparing latch 99 holds data 0 as shown in FIG. 6A.

When first 8 bits of the data to be transmitted is supplied to shift register 97, main control portion 81 detects it and supplies the fetch command to basic authentication data latch 89. Thus basic authentication data latch 89 holds 128-bit data supplied from password store portion 87 and random number latch 85.

Here, similar to the first device, data D is held in basic authentication data latch 89. Because data held in random number latch 85 and the password stored in password store portion 87 are same with those in the first device.

Comparing latch 99 holds an initial value "00 . . . 00" (128 bits) in an initial state as in first device 200.

Computing element 91 performs an exclusive OR operation on the data held in basic authentication data latch 89 and comparing latch 99.

Decoder 93 decodes 128-bit data into 16-bit data. ROM 95 data converts the supplied 16-bit data into 128-bit data. The 128-bit data is supplied to shift register 97. In this case, data (D eor D')' is supplied to shift register 97.

When control portion 91 sends a transmission command, data (D eor D')' is added to the head of the data to be transmitted as a second enciphered authentication data and is transmitted from transmission/reception circuit 103.

Data held in basic authentication data latch 89, comparing latch 99 and shift register 97 are shown in FIG. 6B. As can be seen from the drawing, when a first enciphered authentication data of the second device is transmitted, basic authentication data latch 89 holds data D, comparing latch 89 holds data D' and shift register 97 holds data (D eor D')'.

Then main control portion 81 outputs the fetch command to comparing latch 99.

As data from ROM 95, that is data (D eor D')', has been supplied to an input of comparing latch 99, comparing latch 99 holds data (D eor D')' in response to the fetch command.

When data (D eor D')' is held in comparing latch 99, data from ROM 95, that is data (D eor (D eor D')')', is supplied to an input of comparing latch 99 through computing element 91, decoder 93 and ROM 95.

Then again, main control portion 81 outputs the fetch command to comparing latch 99. Then comparing latch 99 holds data (D eor (D eor D')')'.

Thus, also in second device 300, comparing latch 99 holds the data enciphered through computing element 91, decoder 93 and ROM 95 after the transmission of data to the first device, as shown in FIG. 6C.

The data is held for the following reason. In this embodiment, the encipherment process is performed whenever data for collation is sent from first device 200 to second device 300 or from second device 300 to first device 200.

Therefore, first device 200 and second device 300 must operate so as to coincide the process performed in each device with each other.

First device 200 receives the data to be transmitted with data (D eor D')' at transmission/reception circuit 63. When the data to be transmitted with data (D eor D')' is supplied to shift register 57, main control portion 41 supplies an output command to shift register 57.

Then first 128-bit of the data is supplied to comparator 61. In addition, main control portion 41 supplies a collation command to comparator 61.

Then comparator 61 compares data held in comparing latch 59 with data supplied from shift register 57. In this case, as first device 200 and second device 300 are authorized devices, comparator 61 sends a match signal to main control portion 41.

If second device 200 is a disguising device, data held in comparing latch 59 does not match with data supplied from shift register 57, and main control portion 41 outputs a transmission prohibition command. Thus the pretense can be securely prevented.

Thereafter, a third enciphered authentication data is transmitted from first device 200 in the same manner and second device 300 determines whether the transmitted enciphered authentication data matches with data stored in comparing latch 59 or not.

In the authentication system according to the present invention, upon receiving the encipherment command, the first device generates the enciphered authentication data according to the number of supplied encipherment commands based on the basic authentication data, and transmits the enciphered authentication data, as described above. The second device receives the enciphered authentication data transmitted from the first device, extracts the basic authentication data from the enciphered authentication data based on the encipherment rule employed in the enciphered authentication data generation circuit and stores the extracted authentication data. Then the second device generates the enciphered authentication data according to the number of supplied encipherment commands based on the basic authentication data and transmits the generated enciphered authentication data. The first device determines whether the enciphered authentication data transmitted from the second device matches with an enciphered authentication data which would be generated when the same number of encipherment commands were supplied to the enciphered authentication data generation circuit thereof, and if the determination result is negative, the first device outputs the prohibition command to prohibit the transmission of the data to be transmitted.

Thus, by sequentially modifying the enciphered authentication data for each unit of the data to be transmitted and transmitting the modified data, the pretense can be securely prevented.

Figure 7:
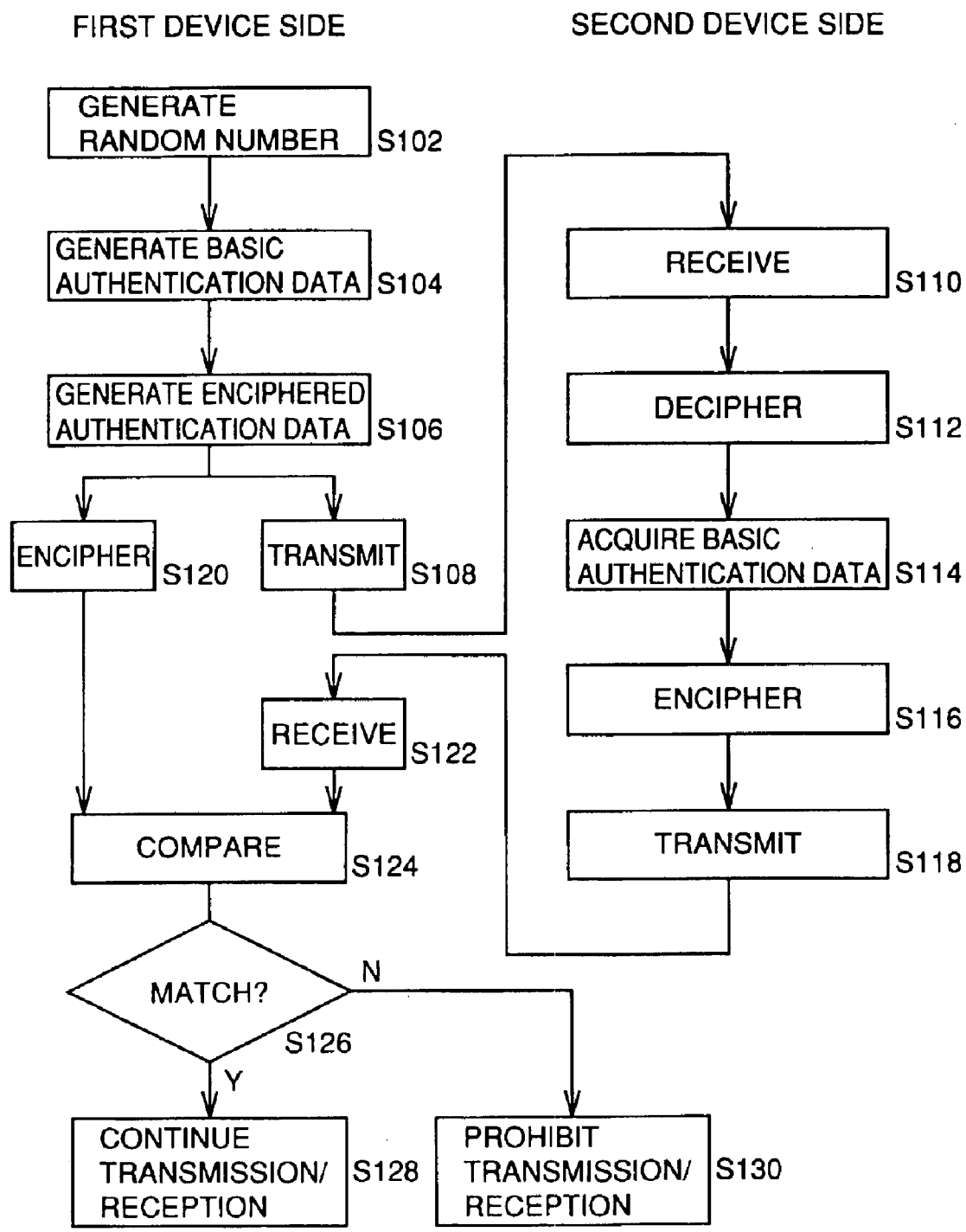
FIG. 7 is a flow chart of an authentication method according to the present invention.

FIG. 7 is a flow chart showing a flow of the authentication method in accordance with the present invention.

First, at the side of the first device, the random number is generated to generate the basic authentication data (Step 102).

Then, the basic authentication data is generated based solely on the generated random number or on the generated random number and a predetermined password, or the like (Step 104).

Then, the basic authentication data is further enciphered according to the encipherment rule corresponding to the number of supplied encipherment commands, and the enciphered authentication data is generated (Step 106).

Thereafter, the enciphered authentication data is added to the data to be transmitted and the resulting data is transmitted to the second device (Step 108).

On the other hand, the enciphered authentication data is further enciphered based on the same encipherment rule as used in Step 106 described above (Step 120).

At the side of the second device, the enciphered authentication data transmitted from the transmission side is received (Step 110), and is deciphered based on the same encipherment rule as used at the side of first device (Step 112).

Then, the basic authentication data is obtained from the deciphered received data (Step 114).

Then, encipherment is performed again based on the obtained basic authentication data and the same encipherment rule as used at the side of the first device (Step 116), and the resulting data is transmitted to the side of the first device (Step 118).

At the side of the first device, the enciphered authentication data is received from the side of the second device (Step 122) and the enciphered authentication data enciphered in Step 120 at the side of the first device is compared with the enciphered authentication data received from the second device at Step 122 (Step 124). In other words, it is determined whether the data matches with an enciphered authentication data which would be generated when the same number of encipherment commands were supplied to the enciphered authentication data generation circuit thereof.

If the comparison result is a match (Step 126), the connected state is maintained (Step 128).

Contrarily, if the comparison result is not a match (Step 126), transmission/reception is prohibited (Step 130).

With the above described structure, the encipherment rule for enciphering can be changed for each unit transmission of the data to be transmitted from the first device in the authentication method of the present invention.

Thus, it is possible to provide an authentication system where the so-called pretense is hard to perform.

In addition, as the 128-bit data is added to the head of the data to be transmitted, the data to be transmitted is also ciphered in effect when the entire data including the data to be transmitted and the added enciphered authentication data is considered as the data to be transmitted. Thus the command (code) is protected from unauthorized access.

Alternatively, it is possible to transmit only the enciphered authentication data and perform the collation as described above, instead of adding the enciphered authentication data to the data to be transmitted and transmitting the resulting data.

In this embodiment, the enciphered authentication data transmitted from the second device is left unchanged and the data generated by enciphering again the enciphered authentication data through computing element 51, decoder 53 and ROM 55 is stored in comparing latch 59 whereby determination on the match is performed.

Thus, first device 200 does not require a circuit for performing a reverse process of computing element 51, decoder 53 and ROM 55.

The present invention, however, is not limited to the above mentioned method and the enciphered authentication data transmitted from the second device may be deciphered and compared by a circuit performing the reverse process of computing element 51, decoder 53 and ROM 55. Alternatively, only a portion rather than an entire portion of the reverse process of computing element 51, decoder 53 and ROM 55 may be performed at the side of first device 200 and the enciphered authentication data transmitted from the second device may be processed so as to match with the data.

Though in this embodiment, the description is made assuming that the present invention is adapted to the IC card (the second device) and a read/write device (the first device) thereof, the authentication device and the authentication method in accordance with the present invention can be employed in any device other than the IC card as described above as far as it is a system for transmitting data between a first device and a second device.

In addition, the present invention can be applied to a contact type IC card as well as the non contact type IC card.

Here in this embodiment, generation of enciphered data different from the previous data is realized by feedback of input data. Alternatively, a structure where a value of input data is modified based on a predetermined rule can be employed. Further alternatively, a structure where an algorithm of encipherment itself is modified without the modification of the input data can be employed.

In this embodiment, when leading 8 bits of the data to be transmitted is supplied to the shift register, the enciphered authentication data is added to the data to be transmitted and is transmitted. An alternative structure can be adapted in which the enciphered authentication data alone is transmitted every predetermined time period with the predetermined time counted by a timer, independently of the transmission of data to be transmitted.

In addition, though the enciphered authentication data is modified for each data to be transmitted in this embodiment, a structure may be adapted in which the enciphered authentication data is modified for each plurality of data to be transmitted.

Further, though in this embodiment, the enciphered authentication data is generated when 8-bit data is detected, this structure is not intended to be limiting and an alternative structure can be adapted, for example, where a generation tiring of the enciphered authentication data is determined according to a time required for the generation process of the enciphered authentication data.

In addition, bit lengths of the enciphered authentication data and the data to be transmitted are not limited to the length mentioned above.

In this embodiment, data on the number of encipherment commands itself is not transmitted, and the number of encipherment commands used at the collation is determined through repeating the encipherment process once at each of the first and second devices. Therefore, it is hard for a third person to analyze how data is enciphered.

The structure of the present invention, however, is not limited to the above mentioned structure and the number of encipherment commands itself may be transmitted.

Alternatively, a structure can be adapted in which a part of the value of the random number is determined in the first device and the remaining part of the value is determined in the second device, and the combination thereof is stored in random number latch 45 and random number latch 85. With such structure, the security can further be improved.

Alternatively, the structure described above realized as a hardware can be implemented in a software.

In the above description, the structure where "the encipherment rule changes according to the number of supplied encipherment commands" includes a structure where a plurality of encipherment rules are stored and the adapted rule is switched from one to another according to the number of supplied encipherment commands, as well as the structure of the embodiment described above where the encipherment rule is changed according to the number of supplied encipherment commands by modifying the repetition level of the encipherment.

Here, "repetition level" means the number of encipherment processes performed through computing element 51, decoder 53 and ROM 55 in first device 200, and the number of encipherment processes performed through computing element 91, decoder 93 and ROM 95 in second device 300.

In addition, the authentication system of the present invention can be used for authentication between a telephone and an IC card for the telephone. In this case, a count deletion command which is a data to be transmitted is supplied to control portion 41 on the side of the telephone every time a predetermined period allowed for conversation corresponding to one count elapses. In this structure, the encipherment process may be performed by ROM 55 and so on and the enciphered authentication data may be sent from transmission/reception circuit 63 to the IC card.

Therefore, the collation as described above can be performed every time the predetermined period of conversation corresponding to one count elapses. Alternatively, the enciphered authentication data may be sent every time the predetermined period of conversation for some counts defined as a unit count elapses rather than every time the predetermined period of conversation for one count elapses.

Alternatively, when the present invention is used for the telephone, a structure is conceivable where a remaining count stored in the IC card is read out first and the conversation is allowed in the range of the remaining count, and the data to be transmitted is transmitted to the IC card during the conversation and at the end of the conversation a count remained at this point is transmitted to the side of the IC card and the count stored in the IC card is rewritten. In this case, the enciphered authentication data alone may be sent every time a predetermined time period elapses.

Specifically, a structure can be adapted where time elapse is counted by a timer and the encipherment command is supplied to control portion 41 when a predetermined time period elapses, and an encipherment process is performed by ROM 55 and so on.

In this embodiment, the enciphered authentication data for performing the authentication is added to the head of the data to be transmitted and the resulting data is transmitted so that the receiving side can extract the enciphered authentication data. The present invention, however, is not limited to this structure, and an alternative structure can be adapted in which data with a predetermined content is set as the data to be transmitted and enciphered according to a predetermined encipherment rule and transmitted, and the receiving side performs a corresponding deciphering process and determines whether the transmitted data to be transmitted is the data of the predetermined content or not.

In other words, "authentication data" means not only the data transmitted separately from the data to be transmitted but also the data to be transmitted itself indirectly utilized as the authentication data.

Here, "the encipherment rule changes for each unit transmission" means not only the case in which the encipherment rule changes for each transmission from the transmitting side to the receiving side, that is for each one transmission, but also the case in which the encipherment rule changes every predetermined times of transmissions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An authentication system comprising a first device and a second device, and transmitting an enciphered authentication data between said first device and said second device and determining whether a transmission of data to be transmitted between said first device and said second device is to be permitted or not, said first and second devices each including:

encipher means for enciphering said authentication data while changing an encipherment rule for each unit transmission of data to be transmitted, wherein said encipher means is configured to change the encipherment rule enciphering said authentication data for each unit transmission according to a number of said transmissions; and transmitting means for transmitting said enciphered authentication data, wherein said first device further includes:

prohibition command output means for determining whether or not a second authentication data, which is transmitted from said second to said first device and generated in said second device by an encipherment based on a first authentication data transmitted from said first device, matches with data generated by enciphering said first authentication data in said first device based on an encipherment rule corresponding to the same number of transmissions, and for supplying a prohibition command prohibiting the transmission of said data to be transmitted as an output when the determination result is negative.

2. The authentication system according to claim 1, wherein said first device includes:

first basic authentication data store means for storing a basic authentication data;

first enciphered authentication data generation means for generating an enciphered authentication data based on said basic authentication data using an encipherment rule when an encipherment command is provided, said first enciphered authentication data generation means configured to change said encipherment rule according to the number of supplied encipherment commands;

first transmitting means for transmitting said enciphered authentication data; and first receiving means for receiving an enciphered authentication data transmitted from said second device, said second device includes:

second receiving means for receiving the enciphered authentication data transmitted from said first device;

basic authentication data acquisition means for extracting the basic authentication data from said enciphered authentication data based on the encipherment rule employed in said enciphered authentication data generation means;

second basic authentication data store means for storing extracted said basic authentication data;

second enciphered authentication data generation means for generated an enciphered authentication data according to the same encipherment rule as in said first device, said second enciphered authentication data generation means configured to change said encipherment rule according to the number of supplied encipherment command; and second transmitting means for transmitting said enciphered authentication data.

3. The authentication system according to claim 2, wherein said first and second enciphered authentication data generation means change said encipherment rule by changing the number of processes repeated for encipherment process according to the number of supplied encipherment commands.

4. The authentication system according to claim 2, wherein said first device further includes:

random number generation means for generating a random number; and basic authentication data generation means for making said basic authentication data stored in said first basic authentication data store means based on a preset setting data and said random number.

5. The authentication system according to claim 2, wherein said first transmitting means adds said enciphered authentication data to said data to be transmitted and transmitting the resulting data, said second receiving means receives said data to be transmitted with said enciphered authentication data, and said basic authentication data acquisition means extracts said enciphered authentication data added to said data to be transmitted and obtains said basic authentication data.

6. The authentication system according to claim 2, wherein said first device transmits said enciphered authentication data every predetermined time period.

7. The authentication system according to claim 2, wherein said first device is a telephone, said second device is an IC card for the telephone, said telephone changes said encipherment rule every time a predetermined time period allowed for conversation corresponding to each unit count elapses.

8. An authentication device included in a first device and employed upon a transmission of data to be transmitted between a second device, comprising:

basic authentication data store means for storing basic authentication data;

enciphered authentication data generation means for generating a first enciphered authentication data based on said basic authentication data using an encipherment rule when an encipherment command is provided, said first enciphered authentication data generation means configured to change said encipherment rule according to the number of supplied encipherment commands;

transmitting means for transmitting said first enciphered authentication data to said second device;

receiving means for receiving a second enciphered authentication data transmitted from said second device; and prohibition command and output means for determining whether or not said second enciphered authentication data, which is transmitted from said second device to said first device and generated in said second device by an encipherment based on said first enciphered authentication data transmitted from said first device, matches with generated by enciphering said first authentication data based on an encipherment rule corresponding to the same number of the encipherment commands supplied to the enciphered authentication data generation means, and for supplying a prohibition command to prohibit the transmission of said data to be transmitted when the determination result is negative.

9. An authentication method employed upon transmission of data to be transmitted between two devices, comprising the steps of:

changing an encipherment rule according to the number of supplied encipherment commands, and generating a first enciphered authentication data based on a basic authentication data at one device of said two devices;

transmitting said first enciphered authentication data from said one device to another device of said two devices;

deciphering said first enciphered authentication data received from said one device, extracting said basic authentication data, generating a second enciphered authentication data according to said encipherment rule at said another device and transmitting the second encipherment authentication data to said one device;

comparing said second enciphered authentication data received at said one device with data generated at said one device by enciphering said first enciphered authentication data according to said encipherment rule according to the number of said supplied encipherment commands and determining whether said generated data match with said received second enciphered authentication data; and allowing the transmission of said data to be transmitted when a result of said determination is a match, and outputting a prohibition command to prohibit the transmission of said data to be transmitted if the result of said determination is a mismatch.

10. The authentication method according to claim 9, wherein the number of processes repeated for enciphering the enciphered authentication data is changed when the encipherment rule is changed according to said number of supplied encipherment commands.

11. The authentication method according to claim 9 wherein said basic authentication data includes a generated random number portion.

12. The authentication method according to claim 9 wherein said enciphered authentication data is added to said data to be transmitted and transmitted.

13. The authentication method according to claim 9 wherein the transmission of said enciphered authentication data is performed every predetermined time period.

14. The authentication method according to claim 9 wherein said one device is a telephone, said another device is an IC card for the telephone, and said authentication method is performed every time a predetermined time period allowed for conversation corresponding to a unit count elapses.

* * * * *